United States Patent Office 3,013,397
Patented Dec. 19, 1961

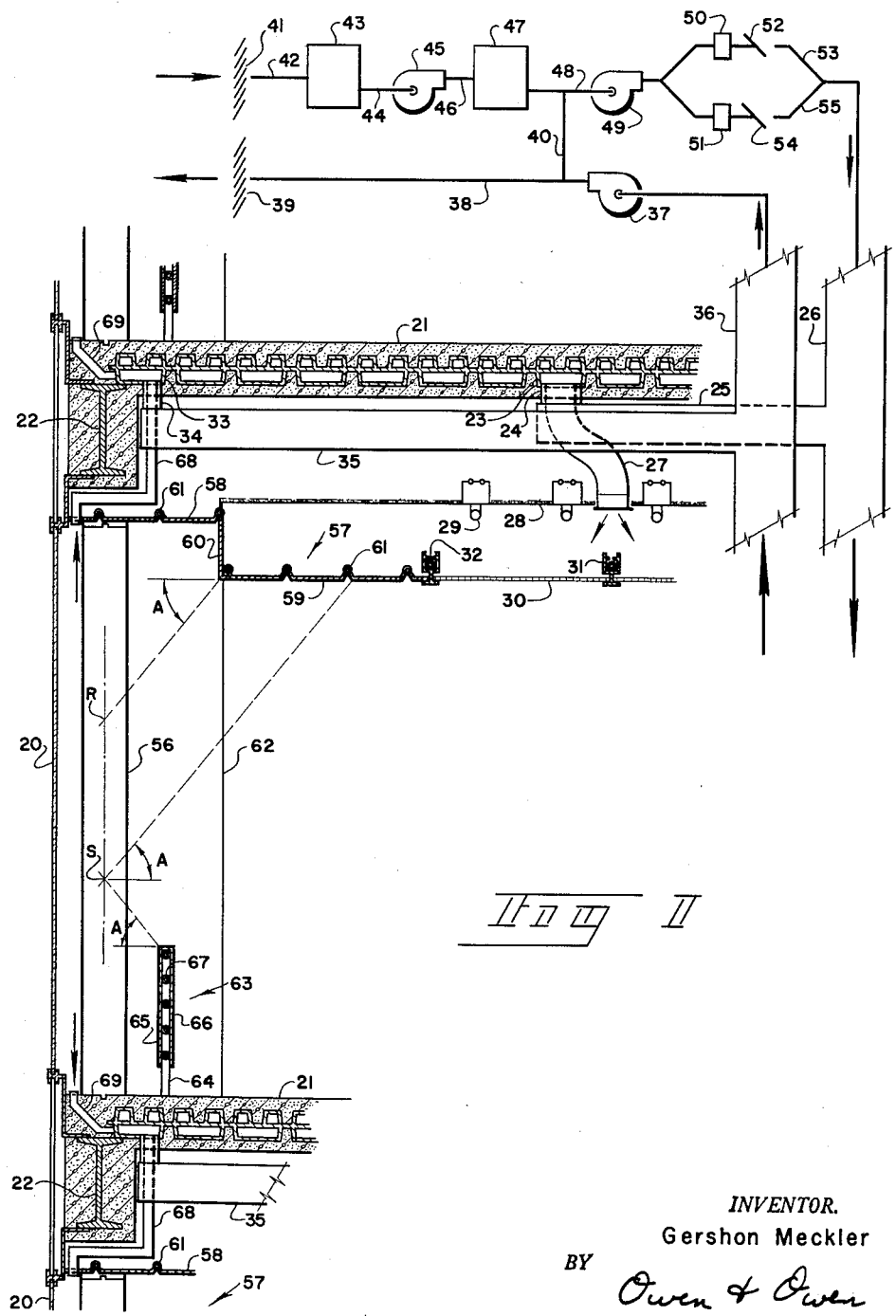

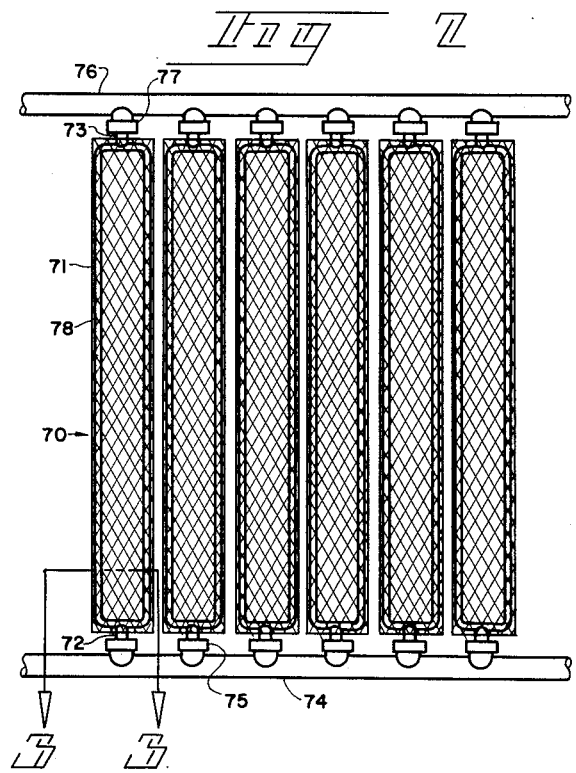
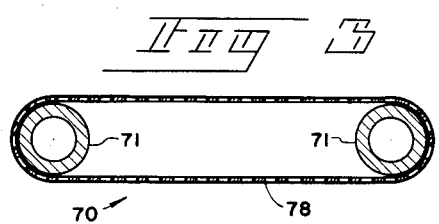
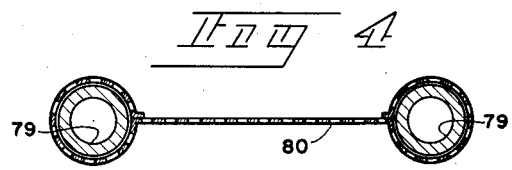

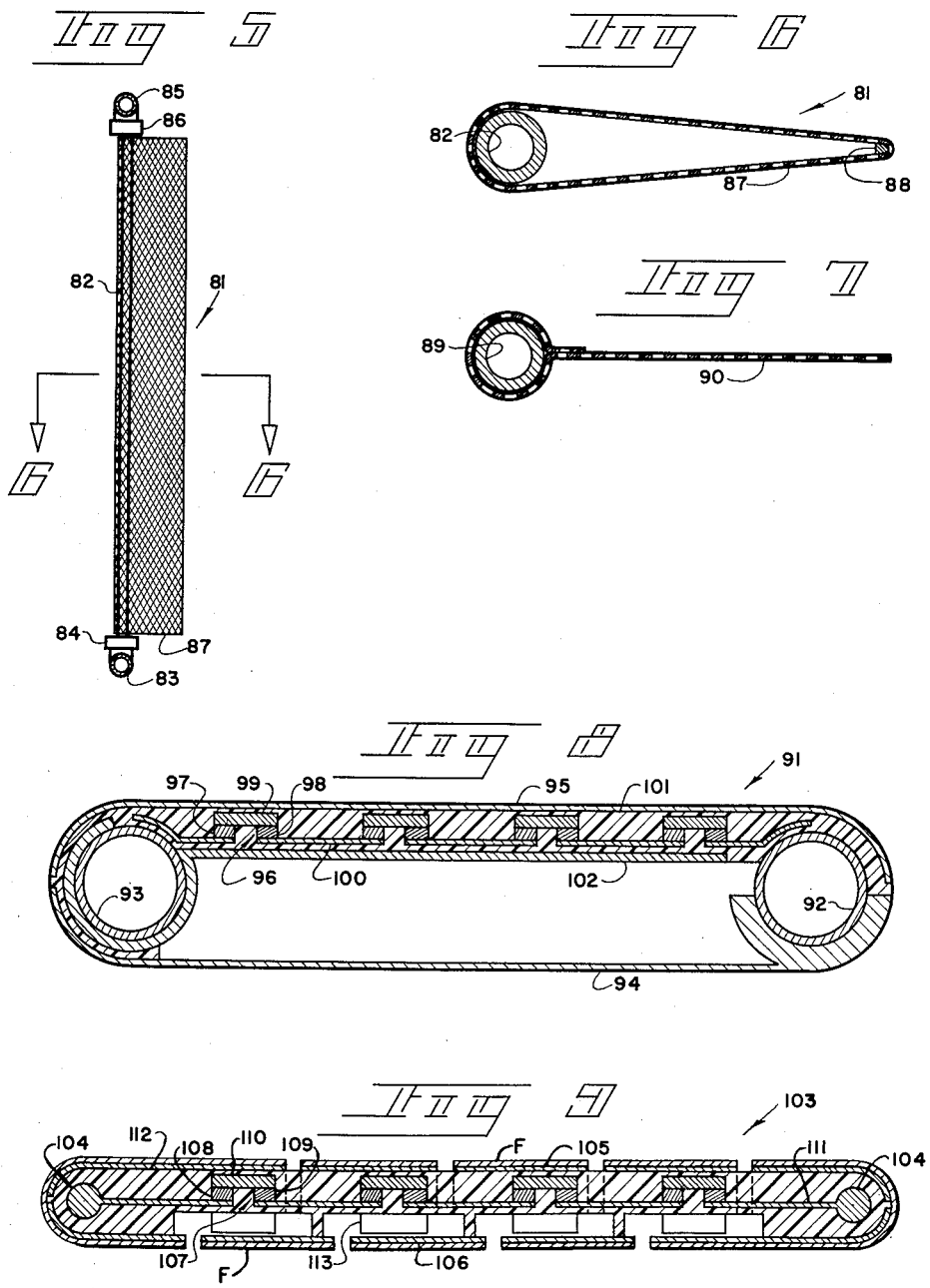

3,013,397
PERIMETER HEAT TRANSFER SYSTEM
FOR BUILDINGS
Gershon Meckler, Toledo, Ohio
Filed June 14, 1960, Ser. No. 35,942
24 Claims. (Cl. 62—3)

The present invention relates to the control of the heat transfer at the perimeter from the exterior to the interior of an enclosed structure such as a building, and more particularly to the dissipation of undesirable heat which is introduced into the perimeter of the building as an incident to natural lighting thereof.

A considerable amount of heat as radiant energy is present in natural light, both in the visible range and in the infrared and ultraviolet ranges. The presence of this heat in natural light causes numerous problems in the heating and air conditioning of buildings. More particularly, a considerable amount of this heat is transmitted through the glass that is used in the building fenestrations into the perimeter, which is the zone extending from the outer wall toward the interior of the building. Thus, a large quantity of heat is present adjacent the outermost wall of the building, especially near the windows and it is highly desirable to dissipate this heat without imposing an excessive load on the circulated conditioned air portion of the air conditioning system.

In most conventional air conditioning systems of the prior art, all heat gains are removed from the perimeter of the building by heat conduction to a surface and subsequent removal by air convection. Also some systems utilize radiant ceilings which are limited in their ability to capture direct radiation from the source of natural light. In the perimeter of the building, surface temperatures become quite high, and often the beneficial effects of conditioned air are cancelled by the interaction of the surface temperatures of walls and surroundings with those of the occupants by radiation.

It is, therefore, an object of the present invention to provide a heat transfer system for the perimeter of a building which utilizes the normal air supply determined by ventilation and humidity control and without an increase in the air flow for dissipating heat that enters the structure through fenestrations as radiant energy.

A further object of the invention is to provide a perimeter heat transfer system for buildings which traps the heat in the perimeter and thereby prevents its entering the interior of the structure.

Other objects and advantages of the invention will be apparent from the following detailed description, reference being had to the accompanying drawings, in which:

FIG. 1 is a view partially in sectional elevation and partially schematic of a building, and shows the relative positions within the building of various components of the perimeter heat transfer system of the present invention;

FIG. 2 is a view in elevation showing an alternate embodiment of a radiant heat absorbing member of the present invention;

FIG. 3 is a sectional view taken along the line 3—3 of FIG. 2;

FIG. 4 is a sectional view of an alternate embodiment of the heat absorbing member shown in FIG. 3;

FIG. 5 is an end view in elevation showing an alternate embodiment of the heat absorbing member of the invention;

FIG. 6 is a sectional view taken along the line 6—6 of FIG. 5;

FIG. 7 is a sectional view of an alternate embodiment of the heat absorbing member shown in FIG. 6;

FIG. 8 is a sectional view of another embodiment of the heat absorbing member; and FIG. 9 is a sectional view of still another embodiment of the heat absorbing member of the invention.

Referring now to the drawings and more particularly to FIG. 1, there is shown the perimeter heat transfer system of the present invention installed in an enclosed structure such as a building. More particularly, the building has a light transmitting panel 20 such as a window installed in an outer wall thereof through which natural light is transmitted into the structure. The panel 20 transmits not only visible light which includes heat but also heat in the ultraviolet and infrared spectra.

The building comprises a plurality of concrete fills on cellular decks 21 that are indirectly supported by beams 22. Passages are formed in the decks 21 to conduct a fluid medium, such as air, for heating or cooling, or other air conditioning of the structure, and certain of these passages, indicated at 23, supply air to the interior of the building.

Air is supplied to the passages 23 through a conduit 24 that is connected to a supply header 25 which is fed from a supply riser 26. Fluid is conveyed from the passages 23 to the various rooms within the building through suitable flexible conduits 27 which extend through a suitable opening in an upper panel 28 in which a plurality of light sources 29 such as fluorescent units are mounted.

Air passes from the conduits 27 into the space between the panel 28 and a lower radiant grid panel 30 that is supported by hangers 31 which carry chambers 32, such as water pipes, in thermal contact with the grid 30. By circulating hot or cold water through the chambers 32, the space temperature and the heat transfer relationship within different partitioned spaces within the building are selectively controlled. For example, the temperature of the air in the building is preferably maintained at 75° F.

Air moves from the interior of the building to certain of the passages in the decks 21 indicated at 33 in a manner which will be later described in detail. From the return passages 33, the air passes through a conduit 34 that is connected to a return header 35 which feeds air to a return riser 36.

The air is removed from the return air riser 36 by means of a suitable return air fan 37 which exhausts into a conduit 38 as schematically illustrated in FIG. 1. A portion of the air leaves both the exhaust conduit 38 and the building through a suitable relief air damper 39.

The remainder of the air leaving the return air fan 37 passes through a conduit 40 into the intake side of the air conditioning system. As shown in FIG. 1, outside air enters the air conditioning system through an intake air damper 41 and passes into a conduit 42 which supplies a first stage dehumidification chamber 43. The amount of outside air which enters through the damper 41 is equal to the amount of air which leaves through the damper 39, and this air is the ventilation air for the system. Air leaves the chamber 43 through a conduit 44 that is connected to a supply air fan 45 which draws ventilation air through the conduits 42 and 44 and the chamber 43.

The discharge side of the fan 45 is connected to a conduit 46 which supplies a second stage dehumidification chamber 47. After the outside air passes through the chamber 47, it moves through a conduit 48 that is connected to both the conduit 40 and the intake side of a supply air fan 49. By connecting the conduit 40 to the conduit 48, the amount of work done on the air in the system is reduced because only the ventilation air passes through the dehumidification chambers 43 and 47. As the air leaves the fan 49, it selectively moves through either a heating coil 50 or a cooling coil 51, depending on the position of a first damper 52 located in a conduit 53 and a second damper 54 located in a conduit 55. Both the conduits 53 and 55 are connected to the supply riser 26 and if the damper 52 is closed and the damper 54 opened, cool air is supplied to the riser 26 while heated air is supplied to this riser if the damper 54 is closed and the damper 52 opened.

According to the present invention, the building includes intermediate heat transfer means in the perimeter adjacent to panel 20 for absorbing heat that is transmitted through this panel, and this intermediate transfer means comprises a plurality of substantially elongated vertically extending members 56 which have oppositely disposed surfaces. One of the surfaces of each of the members 56 faces the panel 20 and absorbs heat while the other surface faces towards the interior of the building, and constitutes a radiating surface. These members 56 preferably extend from the floor formed by the fill on the decks 21 to the ceiling formed by the upper radiant panel 28 and the lower grid panel 30, and each member 56 is pivotally mounted for selective varying of the intensity of the light entering the perimeter, as well as the amount of its surface exposed to the light transmitting panel 20, in the manner indicated in FIGURE 2. However, as the members 56 are rotated, one surface will always face the panel 20 and absorb heat transmitted therethrough while the oppositely disposed surface will face toward the interior of the building.

An important feature of the invention is the provision of a radiant cooling panel member 57 in the perimeter for selectively removing absorbed heat from the members 56 by radiation, and the panel member 57 has a length substantially equal to the length of the panel 20. As shown in FIG. 1, the radiant cooling panel member 57 includes a horizontally extending upper section 58 adjacent the upper radiant panel 28 and a horizontally extending lower section 59 adjacent the lower grid panel 30 as well as a vertically extending intermediate section 60 which connects the upper section 58 and the lower section 59.

The radiant cooling panel member 57 is located adjacent the members 56 but on the opposite side of the members 56 from the light transmitting panel 20, and the radiant cooling panel member 57 has a surface which faces the inner surface of each of the members 56 which is effective to selectively remove heat from the members 56 by radiation. As shown in FIG. 1, the lower surface of the upper section 58 as well as the lower surface of the lower section 59 is substantially normal to the members 56 and face the inwardly directed surface of each member 56. Likewise, the outwardly directed surface of the intermediate section 60 faces the inwardly directed surface of each of the members 56. In a preferred embodiment the cooling panel member 57 comprises a plurality of thermal conductors, such as metal plates, arranged in a gridlike formation to expose a plurality of surfaces to the members 56 thereby increasing the effectiveness of the radiant cooling panel member 57 as a cooling means.

Heat transfer means in the form of a plurality of pipes 61 are provided in thermal contact with the panel member 57, and a suitable heat transfer medium, such as water, is circulated therethrough for removing heat from the radiant cooling panel member 57. The pipes 61 are connected to the building heat transfer system through a header pipe (not shown) that is located in a peripheral building column 62, and this header pipe, as well as pipes 61, is supplied with water, e.g., from a conventional cooling tower. By varying the flow rate of the water in the pipes 61 as well as the temperature of this water, the surface temperature of the panel member 57 can be regulated to selectively control the amount of heat removed from the members 56 by radiation.

All surfaces show substantially no change in emissivity for angles of emission between perpendicular to the surface and about 50° from perpendicular, and this 50° angle is illustrated by angles A in FIG. 1 for various portions of each heat absorbing member 56. The upper section 58 as well as the intermediate section 60 of the radiant cooling member "see," the upper portion of the members 56 within the angle A from the point R to the top thereof and absorb heat therefrom. Heat is removed from the portion of each member 56 below the point R by radiation to the lowermost surface of the lower section 59.

Inasmuch as only the lower section 59 of the radiant cooling panel member 57 is effective to selectively remove heat by radiation from the lower portion of each of the heat absorbing members 56 below the point R, the distance which the lower section 59 extends from the intermediate section 60 toward the interior of the building is determined by the length of the lower portion of each member 56, and this length, in turn, is determined by the height of the panel 20. To prevent the width of the lower section 59 from becoming excessively large and obstructing the light from the source 29, a second radiant cooling panel member 63 is likewise mounted in the perimeter, on the fill on the deck 21, by means of a suitable support bracket 64. The radiant cooling panel member 63 extends substantially parallel to the heat absorbing members 56.

The radiant cooling panel member 63 has an outwardly directed surface 65 which faces the inwardly directed surface of each heat absorbing member 56 to absorb heat therefrom by radiation as well as an inwardly directed surface 66 which likewise constitutes a heat absorbing surface which is effective to absorb by radiation heat that is radiated into the building, e.g., from the inwardly directed surfaces of the heat absorbing members 56. Pipes 67 are mounted within the radiant cooling panel member 63 in thermal contact therewith and a suitable heat exchange medium, such as water, is circulated through the pipes 67 for removing heat absorbed at the surfaces 65 and 66. The pipes 67 are connected to a header pipe (not shown) in the column 62, and by controlling the flow rate as well as the temperature of the water within the pipes 67 the temperature of the surfaces 65 and 66 can be varied to selectively control the amount of radiant heat absorbed by the radiant cooling member 63.

As shown in FIG. 1, the portion of the surface of each heat absorbing member 56 which lies below the point S is "seen" by the surface 65. Thus, as the height of the radiant cooling panel member 63 is increased, the width of the lower section 59 of the radiant cooling panel member 57 can be proportionately decreased. This feature becomes quite important in a building of the type illustrated in FIG. 1 wherein the transparent panel 20 covers the entire wall of the building because the lower section 59 of the radiant cooling member 57 can be reduced to a minimum and the effective lighting area of the lower radiant grid panel can be increased to a maximum.

A second important feature of the invention is the provision of air removal means in the perimeter of the building between the members 56 and the light transmitting panel 20, and this air discharge means is effective to move air from the innermost portion of the perimeter zone across the heat absorbing members 56 to remove heat therefrom, as well as from the panel 20, by convection. By providing this convection cooling means for the heat absorbing members 56 to remove a portion of the heat therefrom, the perimeter heat transfer system may be operated at a relatively high temperature. Consequently the water circulated through the pipes 61 and 67 can be supplied from a conventional cooling tower thereby substantially reducing the overall cost of the air conditioning system because the cooling water need not be mechanically refrigerated.

The air removal means comprises a first air duct 68 located adjacent the ceiling and a second air duct 69 located adjacent the floor. The intake opening of each of the ducts 68 and 69 is positioned between the panel 20 and the heat absorbing members 56 while the discharge end is connected to the air return passages 33. The air is removed from the perimeter at a relatively high temperature, in the range from 85 to 90° F. after removing heat from both the heat absorbing members 56 and the panel 20 without increasing the thermal load which must be carried by the circulated conditioned air to maintain controlled conditions in the interior of the building.

In certain installations where interior space requirements may prohibit the use of a radiant cooling panel member 63 mounted on the floor, a plurality of heat absorbing members 70 of the type shown in FIGS. 2 and 3 may be used instead of the heat absorbing members 56 shown in FIG. 1. Each heat absorbing member 70 comprises a pair of substantially parallel pipes 71 through which a suitable heat transfer medium such as water is circulated. The pipes 71 are joined at both the top and the bottom of the heat absorbing member 70, and a supply pipe 72 that is connected to the junction of the pipes 71 extends from the bottom of the heat absorbing member 70 generally along the center line thereof, upwardly to such junction. Likewise a return pipe 73 extends from the top of the heat absorbing member 70 generally along the center line to a similar connection at the corresponding bottom junction. The supply pipe 72 is pivotally connected to a supply header 74 by means of a suitable swivel connection 75. In a like manner, the return pipe 73 is pivotally connected to a return header 76 by means of a suitable swivel connection 77. Both the supply header and the return header 76 extend substantially parallel to the light transmitting panel 20 and are connected to the building heat transfer system in the column 62.

As shown in FIGS. 2 and 3, the pipes 71 are enclosed by a grid 78 of a thermal conducting material, such as metal, in thermal contact therewith. By utilizing a grid the light entering the building through the light transmitting panel 20 passes through the openings in the grid and is diffused. The extent and nature of this diffusion is determined by the size and spacing of the openings in the grid 78 as well as the relative position of the openings in the opposed surfaces, and the diffusion is regulated by rotating the heat absorbing members 70 about the swivel connections 75 and 77. As the light is diffused heat is absorbed by the grid 78 and air from the interior of the perimeter passes through the openings in the grid 78 to the ducts 68 and 69 to cool the grid by convection. Heat is also removed from the grid 78 by conduction through the grid 78 and the pipes 71 to the water circulating therethrough. By removing a portion of the heat by convection, a much higher temperature water can be circulated through the pipes 71, thereby eliminating the necessity for mechanically refrigerating the water.

In the embodiment shown in FIG. 4, parallel pipes 79 are mounted on headers in the same manner as the pipes 71 of the embodiment shown in FIGS. 2 and 3. A single grid 80 extends between the pipes 79 and is in thermal contact therewith, and heat is absorbed by the grid 80. The absorbed heat is removed from the grid 80 both by convection as air passes through the openings therein and by conduction to the water within the pipes 79.

In the embodiment shown in FIG. 5, heat absorbing members 81 are provided. The members 81 are positioned similar to the heat absorbing members 70 and 56 adjacent the light transmitting panel 20 as shown in FIG. 1. Each heat absorbing member 81 of FIG. 5 comprises a single, vertically extending pipe 82 which is pivotally mounted on a supply header 83 by a swivel connection 84 and on a return header 85 by swivel connection 86. Both the supply header 83 and the return header 85 extend substantially parallel to the light transmitting panel 20 and are connected to the building heat transfer system in the column 62 (FIG. 1).

As is shown in FIG. 6, a pair of fins 87 in thermal contact with the pipe 82 on opposite sides extend outwardly therefrom and are connected to a vertically extending support member 88 that is connected to both the top and the bottom of the pipe 82 adjacent the swivel connections 84 and 86. Each of the fins 87 is made up of a plurality of thermal conductors arranged in a gridlike fashion and light is diffused by these fins in the same manner as it is diffused by the grids 78 in the embodiment shown in FIG. 3. The fins 87 are cooled not only by convection as the air passes therethrough, but also by conduction to the water in the pipe 82.

In the embodiment shown in FIG. 7, a pipe 89 is mounted in the same fashion as the pipe 82 between a supply header and a return header extending along a light transmitting panel such as shown in FIG. 1. A single fin 90 extends outwardly from the vertically extending pipe 89 and is in thermal contact therewith. The fin 90 comprises a plurality of thermal conductors arranged in a gridlike fashion, and these thermal conductors are cooled by both convection and conduction in the manner described in connection with the fins 87 shown in FIG. 6.

In the embodiment shown in FIG. 8, a heat absorbing member 91 comprises a pair of spaced pipes 92 and 93 which extend vertically adjacent a light transmitting panel such as the panel 20 shown in FIG. 1. The pipes 92 and 93 are joined at both the top and bottom of the heat absorbing member 91 and are pivotally mounted on supply and return headers in the same fashion as the heat absorbing member 70 shown in FIG. 2.

The pipes 92 and 93 are enclosed by a pair of oppositely disposed plates 94 and 95, and the heat absorbing member 91 is mounted in the building so that the outer surface of the plate 94 faces the inwardly directed surface of the adjacent light transmitting panel while the outer surface of the plate 95 faces toward the interior portion of the building perimeter. The plate 94 is made from a heat conducting material and is in thermal contact with the pipes 92, and the radiant heat absorbed by the plate 94 is conducted to the pipe 92 where it is removed by the water from the cooling tower that is circulated therethrough.

The outer surface of the plate 95 is likewise effective to remove heat from the interior of the perimeter by radiation, and the plate 95 is cooled by means of a plurality of thermojunctions 96. Each thermojunction comprises a P-type semiconductor element 97 and an N-type semiconductor element 98 as well as a plate 99 which connects the elements 96 and 97 both thermally and electrically. All of the thermojunctions 96 are electrically connected by a conductor 100 to provide a series circuit and a direct current is passed through this circuit in the proper direction to make the plates 99 cold sources. The end of the conductor 100 adjacent the pipe 93 is connected to a supply lead from a direct current source within the building while the opposite end of the conductor 100 is connected by a return lead thereto.

The thermojunctions 96 are carried by a layer 101 of insulating material which not only maintains each of the thermojunctions 96 in thermal contact with the plate 95 and out of electrical contact therewith, but also insulates the plate 94 from the plate 95. The layer 101 further carries a thermal conductor 102 in the interior of the heat absorbing member 91, and the thermal conductor 102 is in thermal contact with the pipe 93. As the direct current is passed through the thermojunctions 96, heat is removed from the plates 99 and conducted to the thermal conductors 102 which, in turn, conduct the heat to the pipe 93 where it is transferred to the circulated water from the cooling tower.

In FIG. 9 there is shown a light transmitting heat absorbing member 103 which comprises a pair of rigid bus bars 104 which extend substantially parallel to the light transmitting panel and are pivotally mounted adjacent the light transmitting panel. The bus bars 104 carry a pair of oppositely disposed apertured transparent members 105 and 106 which not only absorb radiant heat but also diffuse the light passing therethrough. The heat absorbing members 103 are mounted in the building in such a fashion that the outwardly directed surface of the member 105 faces toward the interior of the perimeter while the outwardly facing surface of the member 106 faces the inwardly directed surface of the light transmitting panel. The outer surface of the apertured member 106 is effective to absorb radiant heat that is transmitted through the light transmitting panel, and the member 106 is cooled by the passage of air over both the outer surface and the inner surface thereof as the air enters the apertures.

The outer surface of the apertured member 105 is effective to remove radiant heat from the interior of the perimeter, and this surface is cooled by means of a plurality of thermojunctions 107. Each of the thermojunctions 107 comprises a P-type semiconductor element 108 and an N-type semiconductor element 109 as well as a plate 110 which is connected to the elements 108 and 109, both thermally and electrically. All of the thermojunctions 107 are electrically connected by a conductor 111 to provide a series circuit, and a direct current is passed between the bus bars 104 through this circuit in the proper direction to make the plates 110 cold sources. The thermojunctions 107 are mounted on the apertured member 105 in thermal contact therewith but are maintained out of electrical contact therewith by an insulating layer 112 which is preferably transparent and maintains the members 105 and 106 out of electrical contact with the bus bars 104.

As the direct current is passed through the conductor 111 and the thermojunctions 107 to make the plates 110 cold sources, the opposed hot sources are in thermal contact with a plurality of cooling fins 113 located within the heat absorbing member 103. The fins 113 are cooled by air as it passes through the apertures in both of the plates 105 and 106 into the interior of the heat absorbing member 103.

If desired the heat absorbing member 103 may be so mounted that the plate 105 faces the light transmitting panel to absorb heat therefrom. Likewise thermojunctions may be provided on the plate 106 as well as on the plate 105.

As a further feature of the invention an electroluminescent film F may be deposited on the surface of either of the plates 105 and 106 to amplify the natural light entering the building through the panel 20. Likewise a photo-conductive film may be deposited on the surfaces of the plates 105 and 106 to filter the natural light, and if desired an electroluminescent film may be deposited on the surface of one of the plates while a photo-conductive film may be deposited on the opposite plate. In such an embodiment alternating current bus bars extend along the direct current bus bars 104 and are insulated therefrom. Suitable leads are provided on the alternating current bus bars to pass an alternating current through both the electroluminescent and photo-conductive films.

I claim:

1. In an enclosed structure having a light transmitting panel in an outer wall thereof, heat absorbing means in the perimeter of said structure spaced from, disposed vis-a-vis and substantially coextensive with said light transmitting panel for absorbing heat transmitted through said panel, first cooling means for selectively removing absorbed heat from said heat absorbing means by radiation, and second cooling means for selectively removing absorbed heat from said heat absorbing means by convection.

2. Apparatus as claimed in claim 1, wherein said heat absorbing means comprises a plurality of substantially elongated, vertically extending members having oppositely disposed surfaces, one of said surfaces facing said light transmitting panel, and the other of said surfaces facing said first cooling means.

3. Apparatus as claimed in claim 1, wherein said first cooling means comprises a radiant cooling member in the perimeter of said structure adjacent said heat absorbing means on the opposite side thereof from said light transmitting panel.

4. Apparatus as claimed in claim 1, wherein said second cooling means comprises means for moving air across said heat absorbing means toward said panel, and means adjacent said panel for removing said air from said perimeter.

5. Apparatus as claimed in claim 1, including third cooling means for selectively removing absorbed heat from said heat absorbing means by conduction.

6. In an enclosed structure including a wall with a light transmitting panel mounted therein, a plurality of substantially elongated members each having a first surface spaced from, disposed vis-a-vis and facing said panel, a radiant cooling member in the perimeter of said structure adjacent said elongated members on the opposite side thereof from said panel, said radiant cooling member having at least one surface facing a second surface of each of said elongated members which is oppositely disposed from said first surface, said radiant cooling member being effective to absorb radiant energy from said second surface, and means for circulating a fluid in heat transfer relationship with said radiant cooling member to transfer heat therefrom.

7. In an enclosed structure including a wall having a light transmitting panel therein, a plurality of substantially elongated members extending, in the perimeter of the structure, spaced from, disposed vis-a-vis and facing the panel, between a floor and a ceiling of the structure, a radiant cooling member in the perimeter of the structure adjacent the elongated members for absorbing heat transmitted through the light transmitting panel and absorbed by the elongated members, said radiant cooling member being located near the ceiling and extending inwardly from the elongated members toward the interior of the structure, and heat transfer means for removing heat from said radiant cooling member.

8. Apparatus as claimed in claim 7, wherein said radiant cooling member has a plurality of surfaces and comprises a plurality of thermal conductors arranged in a gridlike formation.

9. Apparatus as claimed in claim 7, wherein said heat transfer means comprises at least one chamber associated with said radiant cooling member for circulating a fluid and removing heat from said radiant cooling member.

10. Apparatus as claimed in cliam 7, including air removal means between said elongated members and said light transmitting panel for removing air from the perimeter of the structure, and means for moving air across the elongated members and through said removal means from the perimeter portion of the structure.

11. In an enclosed structure including a wall with a light transmitting panel therein, a plurality of substantially elongated members extending in the perimeter of the structure adjacent the panel between a floor and a ceiling of the structure and spaced from, disposed vis-a-vis and substantially coextensive with the panel, a radiant cooling member in the perimeter of the structure adjacent the elongated members for absorbing heat transmitted through the light transmitting panel and absorbed by the elongated members, said radiant cooling member being mounted in the vicinity of the floor and extending substantially parallel to the elongated members, and heat transfer means for removing the heat from said radiant cooling member.

12. In an enclosed structure including a wall with a light transmitting panel therein, a plurality of substantially elongated heat absorbing members extending in the perimeter of the structure adjacent the panel between a floor and a ceiling of the structure and spaced from, disposed vis-a-vis and substantially coextensive with the panel, a radiant cooling member in the vicinity of the floor in the perimeter of the structure adjacent the elongated members for absorbing heat transmitted through the light transmitting panel and absorbed by the elongated members, said radiant cooling member having an outwardly directed surface facing a lower portion of the elongated members and an inwardly directed surface facing toward the interior of the perimeter, said outwardly directed surface being effective to remove heat from said lower portion of the elongated members by radiation, and said inwardly directed surface being effective to remove heat from the interior of the perimeter.

13. In combination with a plurality of elongated light diffusing members in an enclosed structure adjacent a wall thereof having a light transmitting panel therein, cooling means for selectively removing absorbed heat from the members by conduction, said cooling means comprising at least one chamber for circulating a heat transfer fluid through each of the members, and means for supplying and removing the fluid to said chamber.

14. Apparatus as claimed in claim 13, wherein each light diffusing member comprises at least one apertured member in thermal contact with said chamber, and additional cooling means for selectively removing absorbed heat from said apertured member by convection, said additional cooling means including means for moving air through the apertures in said member toward the light transmitting panel.

15. In an enclosed structure having a liquid heat transfer system, a plurality of light transmitting panels in the walls of the structure for admitting natural light, and air conditioning means for supplying air to the structure, the improvement comprising a pair of fluid carrying conduits in the perimeter of the structure adjacent each of the light transmitting panels in communication with the fluid heat transfer system, a plurality of pipes extending between said conduits and operatively connected therewith, at least one apertured member extending outwardly from each of said pipes for absorbing heat and diffusing light transmitted through the panel, said members being in thermal contact with said pipe whereby a portion of the heat absorbed by the member is removed by the fluid, and means adjacent each panel for moving the air supplied to the structure from the interior portion of the perimeter to the air conditioning means whereby the air is moved through the apertures in each member and across the panel for removing a portion of the absorbed heat therefrom by convection.

16. Apparatus as claimed in claim 15, including a radiant cooling member in the perimeter of the structure spaced from, disposed vis-a-vis and extended substantially coextensive with said apertured members and having at least one surface facing each of said apertured members.

17. Apparatus for diffusing light and absorbing radiant heat therefrom comprising a panel through which light and heat are transmitted, an apertured member having at least one surface effective to absorb radiant heat, means in thermal contact with said member for removing absorbed heat therefrom by conduction, said means comprising at least one fluid conduit in thermal contact with said member for containing a heat transfer fluid, and means for varying the amount of light transmitted through and the heat absorbed by said apertured member.

18. Apparatus for diffusing light and absorbing radiant heat therefrom, comprising a plurality of spaced members, each having at least one surface effective to absorb radiant heat, a pair of spaced fluid conduits in thermal contact with each of said members for cooling said members, and means for varying the amount of light transmitted through the spaces between and the heat absorbed by said members.

19. Apparatus as claimed in claim 18, including a plurality of thermojunctions mounted between said apertured members, each of said thermojunctions comprising a P-type semiconductor element connected to an N-type semiconductor element by means of a plate which is both heat conducting and electrically conducting, said thermojunctions being electrically connected to provide at least one series circuit for carrying a direct current.

20. Apparatus for absorbing radiant heat transmitted through a light transmitting panel in a wall of a building and from the interior of the building, comprising a pair of spaced members each having a surface effective to absorb heat by radiation, and means for cooling said pair of spaced members, said means comprising a plurality of thermojunctions, each of said thermojunctions comprising a P-type semiconductor element connected to an N-type semiconductor element by means of a plate which is both heat conducting and electrically conducting, means for electrically connecting said thermojunctions to provide at least one series circuit, and means for varying the amount of heat absorbed by said members including means for pivoting said members.

21. Apparatus as claimed in claim 20, including an electroluminescent film carried by at least one of said surfaces, and means for supplying an alternating current to said film.

22. Apparatus as claimed in claim 20, including a photo-conductive film carried by at least one of said surfaces, and means for supplying an alternating current to said film.

23. Apparatus as claimed in claim 20, including an electroluminescent film carried by one of said surfaces and a photo-conductive film carried by the other of said surfaces, and means for supplying an alternating current to both of said films.

24. In an enclosed structure having a radiant energy transmitting panel in an outer wall thereof, heat absorbing means in the perimeter of said structure spaced from, disposed vis-a-vis and substantially coextensive with the radiant energy transmitting panel for absorbing heat transmitted through the panel, means for removing the heat absorbed by said heat absorbing means, and means for simultaneously varying the amount of light transmitted through and the amount of heat absorbed by said heat absorbing means.

References Cited in the file of this patent

UNITED STATES PATENTS

| | | |
|---|---|---|
| 1,888,900 | Austen | Nov. 22, 1932 |
| 2,523,332 | Riehl | Sept. 26, 1950 |
| 2,534,148 | Russell | Dec. 12, 1950 |
| 2,651,503 | Mills | Sept. 8, 1953 |
| 2,677,749 | Raider | May 4, 1954 |
| 2,703,702 | Meinel | Mar. 8, 1955 |
| 2,844,638 | Lindenblad | July 22, 1958 |
| 2,845,253 | Runte | July 29, 1958 |
| 2,932,954 | Evans | Apr. 19, 1960 |